US012798477B2

(12) United States Patent
Nguyen et al.

(10) Patent No.: US 12,798,477 B2
(45) Date of Patent: Nov. 17, 2026

(54) MOTOR VEHICLE WITH ADAPTIVE SEATING SYSTEM

(71) Applicant: American Honda Motor Co., Inc., Torrance, CA (US)

(72) Inventors: Jean-Hugues Tuan Huy Nguyen, Los Angeles, CA (US); Junyoung Choi, Fullerton, CA (US); Romain Daniel Charles Mivelle, Los Angeles, CA (US)

(73) Assignee: American Honda Motor Co., Inc., Torrance, CA (US)

(*) Notice: Subject to any disclaimer, the term of this patent is extended or adjusted under 35 U.S.C. 154(b) by 0 days.

(21) Appl. No.: 18/982,270

(22) Filed: Dec. 16, 2024

(65) Prior Publication Data

US 2026/0167102 A1 Jun. 18, 2026

(51) Int. Cl.

| | |
|---|---|
| ***B60Q 3/233*** | (2017.01) |
| ***B60N 2/02*** | (2006.01) |
| ***B60N 2/12*** | (2006.01) |
| ***B60N 2/14*** | (2006.01) |
| ***B60Q 3/70*** | (2017.01) |
| ***B60R 22/04*** | (2006.01) |
| ***B60R 22/48*** | (2006.01) |

(52) U.S. Cl.

CPC ......... *B60Q 3/233* (2017.02); *B60N 2/02246* (2023.08); *B60N 2/12* (2013.01); *B60N 2/14* (2013.01); *B60Q 3/731* (2022.05); *B60R 22/04* (2013.01); *B60R 22/48* (2013.01); *B60Q 2800/10* (2022.05)

(58) Field of Classification Search

USPC ................................................ 701/1

See application file for complete search history.

(56) References Cited

U.S. PATENT DOCUMENTS

| | | | | |
|---|---|---|---|---|
| 5,503,461 | A | 4/1996 | Schreier | |
| 6,623,074 | B2 | 9/2003 | Asbach | |
| 7,334,829 | B2 * | 2/2008 | Fukui | B60N 2/14 296/65.11 |
| 7,597,395 | B2 | 10/2009 | Wiedeman | |
| 8,007,043 | B1 | 8/2011 | Vuong | |
| 9,694,741 | B2 * | 7/2017 | Salter | B60N 2/62 |
| 9,802,535 | B2 * | 10/2017 | Line | B60N 2/70 |
| 10,518,684 | B2 | 12/2019 | Kondrad | |
| 11,167,722 | B2 | 11/2021 | Debie | |
| 11,485,264 | B2 | 11/2022 | Sieber | |
| 11,597,317 | B2 | 3/2023 | Lee | |
| 11,845,362 | B2 | 12/2023 | Kaku | |
| 12,606,059 | B2 * | 4/2026 | Nagata | B60N 2/0256 |

(Continued)

FOREIGN PATENT DOCUMENTS

| | | | | |
|---|---|---|---|---|
| DE | 202018002758 | U1 | 10/2018 | |
| DE | 102018212118 | A1 * | 1/2020 | B60Q 3/20 |

(Continued)

*Primary Examiner* — Adam D Tissot

(74) *Attorney, Agent, or Firm* — Plumsea Law Group, LLC

(57) ABSTRACT

An adaptive seating system in a motor vehicle includes a seat. The position and orientation of the seat may be adjusted according to a driving mode of the motor vehicle. The seat includes an illuminated portion and the color of the illuminated portion may be adjusted according to the driving mode of the motor vehicle. The seat also includes a retractable and extendable five-point harness.

10 Claims, 10 Drawing Sheets

(56) References Cited

U.S. PATENT DOCUMENTS

| | | | | |
|---|---|---|---|---|
| 2017/0028987 | A1* | 2/2017 | Yamada | B60W 60/0054 |
| 2018/0105102 | A1* | 4/2018 | Ohashi | B60K 35/28 |
| 2020/0180555 | A1* | 6/2020 | Kim | B60R 22/3405 |
| 2021/0309123 | A1 | 10/2021 | Kang | |
| 2023/0166644 | A1* | 6/2023 | Yun | B60N 2/3065<br>297/311 |
| 2024/0001825 | A1* | 1/2024 | Morris | B60N 2/42 |
| 2025/0222835 | A1* | 7/2025 | Maloney | B60N 2/06 |

FOREIGN PATENT DOCUMENTS

| | | | |
|---|---|---|---|
| EP | 2059410 | B1 | 12/2013 |
| EP | 2117931 | B1 | 9/2014 |
| EP | 3300944 | B1 | 10/2020 |
| JP | H09506843 | A | 7/1997 |
| JP | 3326461 | B2 | 9/2002 |
| JP | 5308020 | B2 | 10/2013 |
| KR | 20150007559 | A | 1/2015 |
| KR | 101701112 | B1 | 2/2017 |

* cited by examiner

MOTOR VEHICLE WITH ADAPTIVE SEATING SYSTEM

BACKGROUND

The present disclosure relates to motor vehicles, and in particular to seating for motor vehicles.

Motor vehicles include various systems that are adapted to user preferences and performance needs. These may include the use of displays, audio systems, and HVAC systems that provide comfort an entertainment. Some motor vehicles may also be operated in different modes, for example, in an autonomous driving mode and a manual driving mode. However, the operation of other vehicle systems separate from direct control of the vehicle tend to be unchanged between different driving modes. Drivers do not have the option for their vehicles to match an emotional state to a driving mode to enhance the driving experience.

There is a need in the art for a system and method that addresses the shortcomings discussed above.

SUMMARY

Embodiments provided herein disclose systems and methods for operating vehicles systems within an interior of a motor vehicle according to different driving modes. The vehicle systems may include seats. The position, orientation, illumination characteristics, and deployment state of a harness may be dynamically adjusted according to the driving mode.

In some aspects, the techniques described herein relate to a motor vehicle, including: a seat, the seat further including an illuminated portion; wherein the motor vehicle is configurable in a first driving mode and a second driving mode; and wherein the illuminated portion has a first color in the first driving mode and wherein the illuminated portion has a second color in the second driving mode, wherein the second color is different from the first color.

In some aspects, the techniques described herein relate to a motor vehicle, including: a seat, wherein the seat is configurable in a first position and wherein the seat is configurable in a second position; wherein the motor vehicle is configurable in a first driving mode and a second driving mode; and wherein the seat is automatically adjusted to the first position when the motor vehicle enters the first driving mode and wherein the seat is automatically adjusted to the second position when the motor vehicle enters the second driving mode.

In some aspects, the techniques described herein relate to a motor vehicle, including: a seat and a harness integrated into the seat, the harness having a retracted position in which the harness is retracted within the seat and the harness having an extended position in which the harness is extended from the seat and configured to secure an occupant in the seat; wherein the motor vehicle is configurable in a first driving mode and a second driving mode; and wherein the harness is automatically placed in the retracted position when the motor vehicle is in the first driving mode and wherein the harness is automatically placed in the extended position when the motor vehicle is in the second driving mode.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments may be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

The exemplary embodiments may make use of any of the systems, components, methods or other provisions disclosed in U.S. Ser. No. 18/982,568, filed concurrently with the present application, to Nguyen et al., and titled "Motor Vehicle with Adaptive Rear Bench," which is incorporated by reference herein in its entirety.

The embodiments provide systems and methods for an adaptive seating system that automatically adapts the position, orientation, illumination, and harness of vehicle seats according to different vehicle driving modes.

Figure 1:
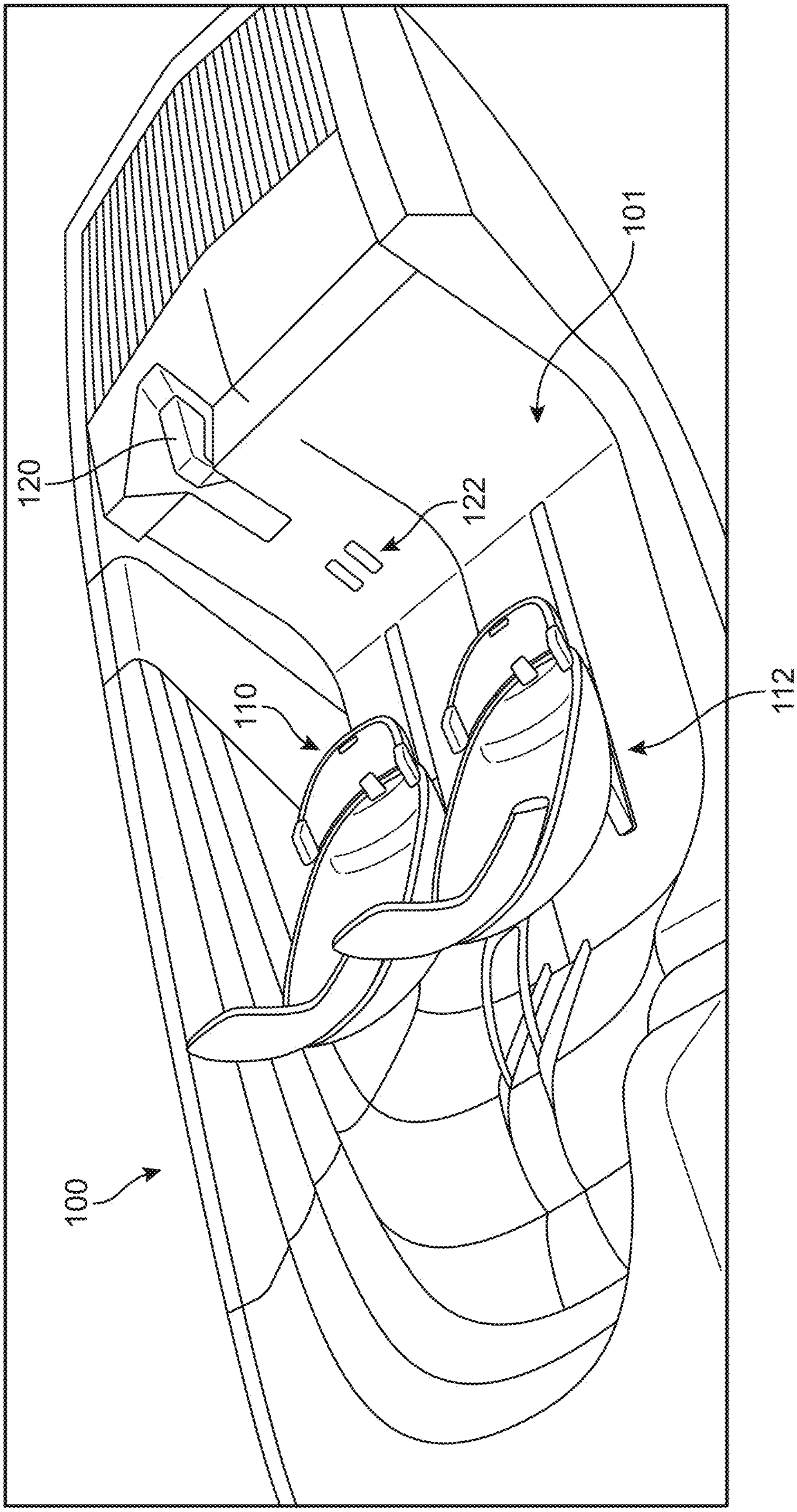
FIG. 1 is a schematic view of an interior cabin of a motor vehicle, according to an embodiment.

FIG. 1 is a schematic view of an interior cabin 101 of a motor vehicle 100. The vehicle 100 may be a non-autonomous vehicle, a semi-autonomous vehicles, or fully autonomous vehicles, for example, as defined by National Highway Traffic Safety Administration (NHTSA). Examples of vehicles that may be used with the embodiments include, but are not limited to, a three-wheeler vehicle, a four-wheeler vehicle, a hybrid vehicle, or a vehicle with autonomous drive capability that uses one or more distinct renewable or non-renewable power sources. Vehicles may use renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicles may have load carrying capabilities that uses one or more distinct trailers.

As seen in FIG. 1, interior cabin 101 includes a first seat 110 and a second seat 112. Interior cabin 101 may also include deployable steering controls 120 and acceleration/braking controls 122.

Motor vehicle 100 may be configured to operate in one or more modes. For example, motor vehicle 100 may be operated in an "autonomous driving mode" and/or a "manual driving mode" and/or a "sport driving mode". In the manual and sport driving modes, occupants may interact with steering controls 120 and/or acceleration/braking controls 122 to steer, drive, and brake motor vehicle 100. The sport driving mode may provide more vehicle power, acceleration, deceleration, responsiveness, or performance than the manual driving mode. By contrast, in the autonomous driving mode, the occupants may not interact with any controls. In some cases, motor vehicle 100 may be operated in a "parking mode", also referred to as a "welcome mode". This mode may be used while the vehicle is parked, waiting for occupants to settle in, or otherwise not moving.

Some embodiments may include features intended to elicit emotional responses (or other mental states) in a driver or other occupant while the vehicle is operating. By eliciting or fostering particular kinds of emotions, a user (driver or other occupant) may feel more engaged, which may improve the overall user experience and may improve both safety and vehicle performance. In some cases, one or more vehicle systems may be operated to elicit different emotional experiences in different vehicle modes. As an example, in a welcome mode, various systems in the vehicle may be operated to elicit emotions (and other mental states) such as calm and a sense of being welcomed into a vehicle. As another example, in an autonomous driving mode, various systems in the vehicle may be operated to elicit emotions (and other mental states) such as relaxation and/or moderate amounts of mental stimulation. As another example, in a manual or sport driving mode, which may be characterized as an "immersive performance mode," various systems in the vehicle may be controlled to elicit emotions (and other mental states) such as excitement and extreme focus.

Figure 2:
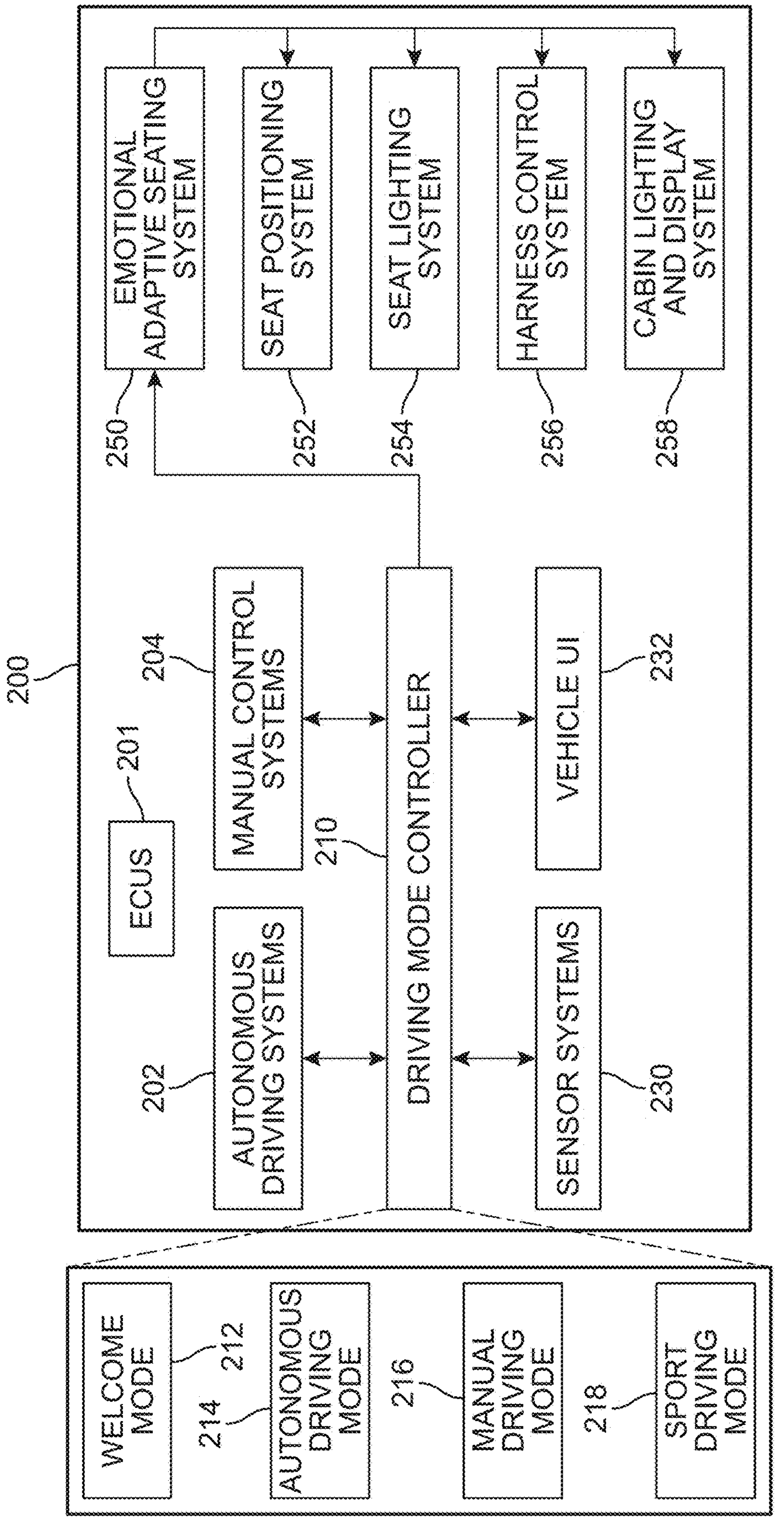
FIG. 2 is a schematic view of a system diagram of some components of a motor vehicle that may facilitate operation of the vehicle in one or more driving modes, as well as components that may be operated to elicit particular emotional responses, according to an embodiment.

FIG. 2 is a schematic view of a system diagram 200 of some components of motor vehicle 100 that may facilitate operation of the vehicle in one or more driving modes, as well as components that may be operated to elicit particular emotional responses, according to an embodiment.

In some embodiments, motor vehicle 100 may comprise hardware and software components. In particular, motor vehicle 100 may include one or more electronic control units 201 (ECUs 201). ECUs 201 may comprise one or more discrete computing systems that may each include one or more processors, as well as non-transitory computer-readable media (memory) for storing instructions that may be executed by the one or more processors. Various electronic systems in vehicle 100 may be operated using ECUs and/or any other suitable computing systems with processors and memory.

Motor vehicle 100 may include both autonomous driving systems 202 and manual control systems 204. Autonomous driving systems 202 may comprise systems for directly controlling a vehicle in a partially autonomous mode or in a fully autonomous mode. Exemplary control systems used for autonomous driving include drive-by-wire systems, specifically throttle by wire, brake by wire, shift by wire, steer by wire, and other electrical control systems to facilitate autonomous driving. Autonomous driving systems 202 may also includes suitable software for monitoring real time information from vehicle sensors (such as cameras, LIDAR devices, speed sensors, braking sensors, and other sensor systems) and autonomously controlling the vehicle in response.

Manual control systems 204 may include various controls for manually steering, accelerating, and braking. Manual control systems 204 may further include the aforementioned controls for sport driving mode. Exemplary controls may include, for example, steering control 120 and acceleration/braking controls 122 shown in FIG. 1.

Motor vehicle 100 may also include a driving mode controller 210. Driving mode controller 210 may comprise suitable hardware and software for controlling one or more systems in response to a selected operating mode. Driving mode controller 210 may control one or more systems according to the 'driving mode state', which may take on one of at least three possible driving modes. These include a welcome mode 212, an autonomous driving mode 214, a manual driving mode 216, and a sport driving mode 218. Each mode is identified with operating characteristics of the vehicle, such as whether the vehicle is driving or parked, and whether the vehicle is being driven autonomously or manually.

In some embodiments, when autonomous driving mode 214 is selected, driving mode controller 210 automatically activates autonomous driving systems 202. Likewise, when manual driving mode 216 is selected, driving mode controller 210 automatically activates manual control systems 204, allowing the driver to take control of the vehicle. Likewise, when sport driving mode 218 is selected, driving mode controller 210 automatically activates manual control systems 204, allowing the driver to take control of the vehicle.

The driving mode may be determined automatically, for example, based on information received from one or more sensor systems 230. Motor vehicle 100 may be equipped with a wide array of sensor systems to enhance safety, performance, and user experience. These include radar sensors for detecting nearby objects and vehicles, LiDAR (Light Detection and Ranging) for creating detailed 3D maps of the vehicle's surroundings, ultrasonic sensors for short-range object detection and parking assistance, cameras for visual input and lane detection, GPS for navigation and positioning, accelerometers and gyroscopes for measuring vehicle movement and orientation (e.g., G-forces), temperature sensors for monitoring engine and cabin conditions, pressure sensors for tire pressure monitoring and engine management, and infrared sensors for night vision capabilities. Other embodiments may include other suitable sensors.

As an example, when a vehicle is placed in park by either a user or an autonomous system, the driving mode may automatically be changed to welcome mode 212. Likewise, while moving, sensor systems 230 may detect changes requiring a change in the driving mode. For example, a system may detect an exit sign from a highway and may automatically switch the operational mode of the vehicle from autonomous (which may be used primarily for highway driving) to manual. Alternatively, in some cases, a user may select a desired vehicle mode using vehicle UI 232.

In some cases, the driving mode may be actively selected by a user, for example, using vehicle user interface ("vehicle UI") 232. For example, a user may select autonomous or manual driving using a touch-screen or buttons in the vehicle cabin.

Whether the driving mode is actively selected or passively determined, driving mode controller 210 may pass information about the driving mode to emotional adaptive seating system 250. Emotional adaptive seating system 250 may then control one or more subsystems of motor vehicle 100 that may be used to elicit predetermined emotional responses according to the driving mode. In the exemplary system, emotional adaptive seating system 250 may communicate with a seat positioning system 252, a seat lighting system 254, and a harness control system 256.

Each of these systems may comprise various components and suitable software for autonomously operating the components. For example, seat positioning system 252 may comprise electromechanical components for automatically adjusting the position and orientation of a seat as well as suitable hardware and software for controlling the electromechanical components. Seat lighting system 254 may comprise illuminated components for automatically adjusting lighting around the seat as well as suitable hardware and software for controlling the illuminated components. Harness control system 256 may comprise harness straps that may be automatically retracted and extended and engaged around a user as well as suitable hardware and software for controlling the harness straps.

Optionally, in some cases, emotional adaptive seating system 250 may communicate with a cabin lighting and display system 258. Cabin lighting and display system 258 may include provisions for illuminating other portions of a cabin, including generating various visual stimuli that may supplement eliciting emotions in a user.

Each of these systems may be operated differently according to the selected driving mode to elicit specific emotional responses and improve user engagement with motor vehicle 100 and the overall driving experience.

Figure 3:
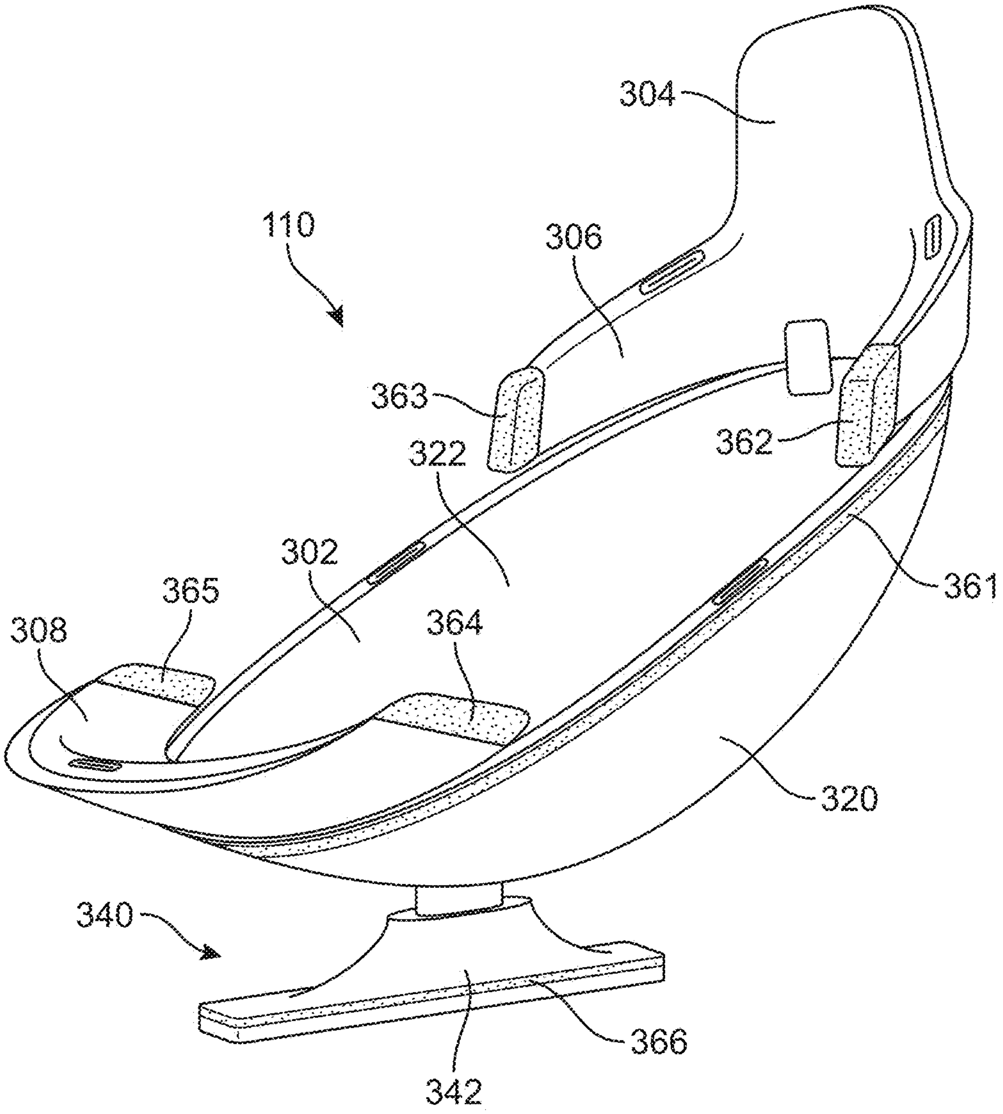
FIGS. 3-4 are schematic perspective views of a seat in a motor vehicle, according to an embodiment.
Figure 4:
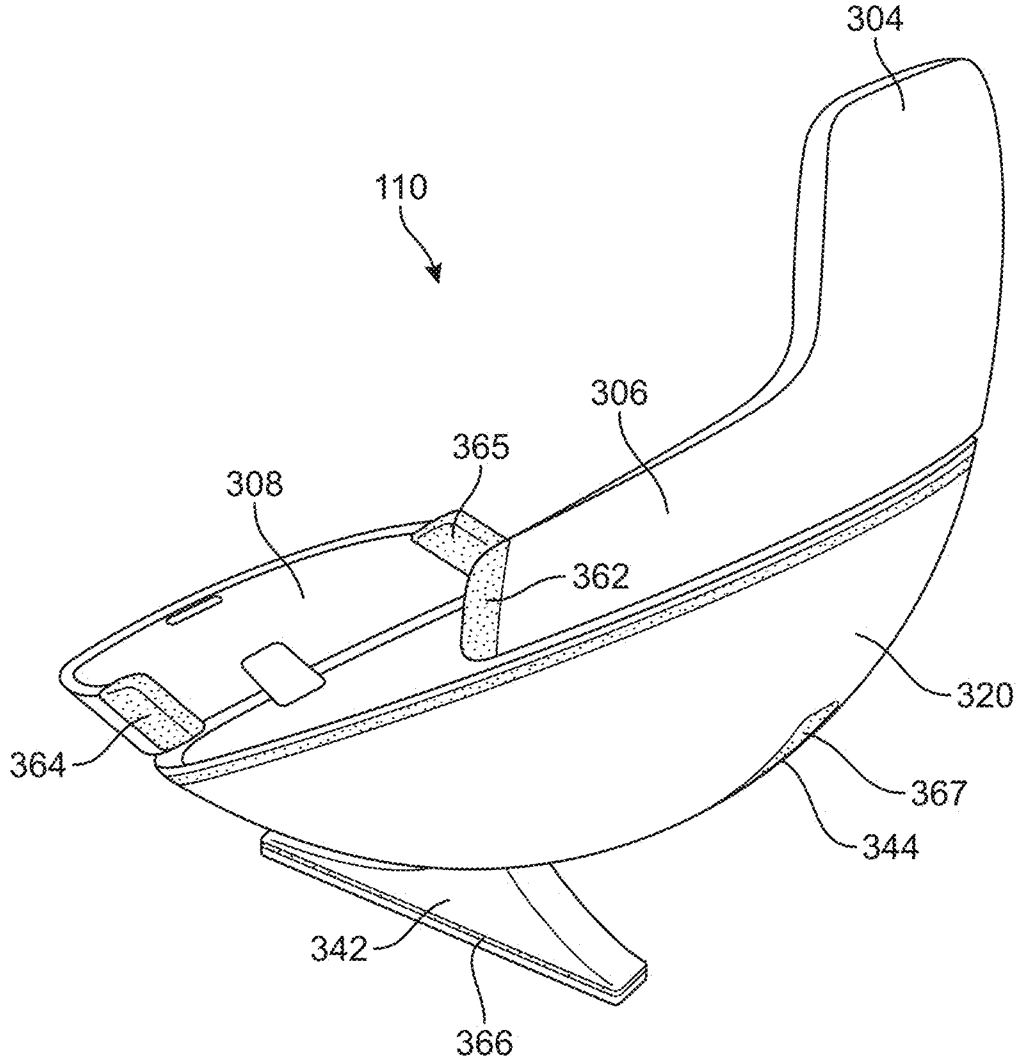

FIGS. 3-4 are schematic views of first seat 110. While first seat 110 is discussed in detail, it may be appreciated that in some cases similar provisions may also apply to second seat 112. Moreover, in embodiments with three or more seats, these provisions may also apply to any additional seats.

Referring to FIGS. 3-4, first seat 110, also referred to simply as seat 110, includes a body 302, a headrest 304, an upper bolster portion 306 and a lower bolster portion 308.

Body 302 is comprised of an outer backing portion 320 and an inner cushioning portion 322. In the exemplary embodiment, body 302 may have a rounded, or egg-like geometry. However, in other embodiments body 302 may have any other suitable geometry.

In operation, part of a user's back and upper leg may be received within cushioning portion 322. The user's shoulders may be partially supported by upper bolster portion 306 and a portion of the user's legs may be supported by lower bolster portion 308. A user's head may also be supported by headrest 304.

In some embodiments, upper bolster portion 306 and/or lower bolster portion 308 may be adjustable. For example, upper bolster portion 306 may be raised to different heights with respect to body 302. Also, lower bolster portion 308 may be extended to different lengths with respect to body 302. In some cases, the adjustment of one or more bolster portions could be automatic and may be changed according to the driving mode. For example, lower bolster portion 308 may be extended in an autonomous driving mode to provide a stool-like platform for a user to rest his or her legs and may be retracted in a manual/immersive driving mode. In other cases, the adjustment of one or more bolster portions could be done manually.

Seat 110 may be secured to a floor of motor vehicle 100 using an attachment assembly 340. Attachment assembly 340 may comprise a base attachment member 342 and a spine member 344 (best seen in FIGS. 4 and 5). Base attachment member 342 may be coupled to spine member 344 in an adjustable manner, such that the position and orientation of body 302 may be adjusted with respect to base attachment member 342.

Seat 110 may be configured with a seat lighting system. The seat lighting system includes one or more illuminated portions, as well as suitable hardware and software for controlling the operation of the illuminated portions. As used herein, the term "illuminated portion" refers to any portion of a seat that may be illuminated. An illuminated portion may comprise one or more lights, and/or other materials that may be illuminated, as well as coverings for the lights/materials.

Embodiments may use any suitable materials for illumination. Exemplary materials for generating light include, but are not limited to: incandescent bulbs, LEDs, electroluminescent (EL) wire or panels, fiber optic fabric or strands, LED-embedded resin, photoluminescent (glow-in-the-dark) plastics, glass-reinforced polyester (GRP), OLED (Organic Light-Emitting Diode) panels, quantum dot-enhanced plastics, transparent conductive films (e.g., ITO-coated materials), light-diffusing fabrics with embedded LEDs, and phosphorescent ceramics. Moreover, illuminated portions may also include other materials that act to cover illuminated materials, such as acrylics, polycarbonates, silicone, or other suitable materials.

Illuminated portions may be configured in various illumination patterns. As used herein, an illumination pattern comprises any set of illumination or lighting characteristics, including, but not limited to the color and intensity of light. In some cases, an illumination pattern may also comprise a pattern of pulsing, or switching one or more illuminated portions on and off.

As seen in FIGS. 3-4, seat 110 includes a plurality of illuminated portions. These include a first illuminated region 361 around a periphery of body 302. In particular, first illuminated region 361 comprises a ring-like or circular portion. Seat 110 also includes a second illuminated region 362 and a third illuminated region 363 disposed at the ends of upper bolster portion 306, as well as fourth illuminated region 364 and fifth illuminated region 365 on lower bolster portion 308. Seat 110 may also include a sixth illuminated region 366 at lower periphery of base attachment member 342 and a seventh illuminated region 367 associated with spine member 344 (see FIG. 4). Together, the plurality of illuminated portions may be illuminated with different colors and other lighting characteristics according to the selected driving mode, as discussed in further detail below.

Figure 5:
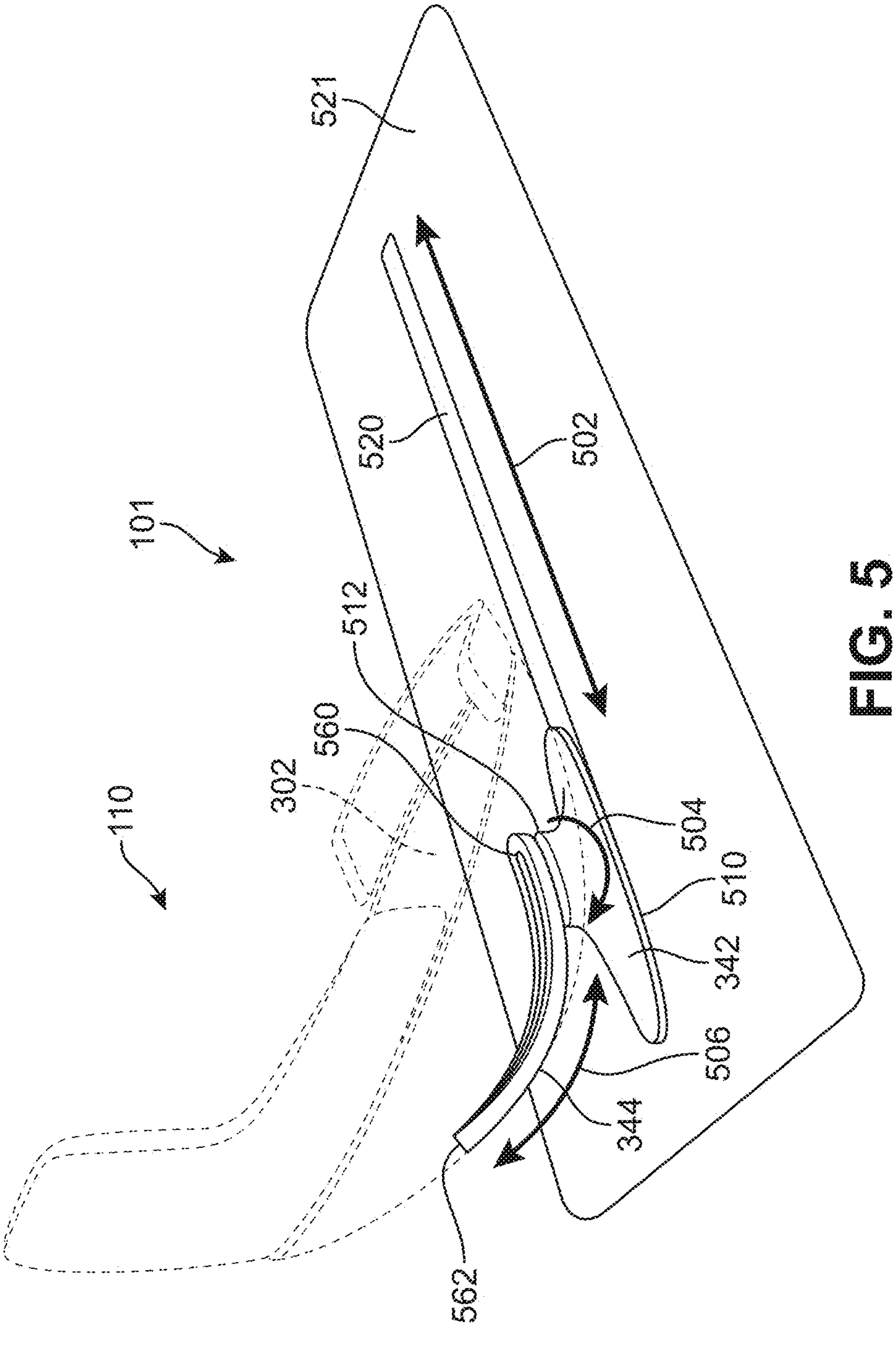
FIG. 5 is a schematic view depicting the various ways the position and orientation of a seat may be changed, according to an embodiment.

Referring next to FIG. 5, seat 110 may be configurable in a variety of different positions and orientations within interior cabin 101. In some embodiments, seat 110 may be configured to translate in a linear direction 502, such as forward and rearward, within interior cabin 101. In some cases, this linear translation may be accomplished by attaching a lower end 510 of base attachment member 342 to a track 520 within the floor 521 of interior cabin 101. In some cases, base attachment member 342 may be attached to a sliding track integrated into the floor 521 of interior cabin 101. In some cases, motor vehicle 100 includes automated mechanisms, such as a chain and motor, for automatically positioning seat 110 at different locations along track 520.

In some cases, seat 110 may be configured to pivot in a rotational direction 504. Specifically, seat 110 may pivot about the connection between an upper end 512 of base attachment member 342 and spine member 344 of seat 110. This allows seat 110 to be rotated to face in any direction within interior cabin 101, including a forward facing direction (towards a front of motor vehicle 100) and a rearward facing direction (towards a rear of motor vehicle 100). Alternatively, in some cases, seat 110 may pivot about the attachment point between base attachment member 342 and track 520.

In some cases, seat 110 may be configured to tilt or incline to different orientations about another rotational direction 506. In some embodiments, the connection point between upper end 512 of base attachment member 342 and spine member 344 may change, such that the orientation of seat 110 changes between a more upright/vertical orientation and a reclined orientation. In particular, because spine member 344 has a curved geometry, as upper end 512 slides along spine member 344, the relative orientation between body 302 and the vehicle floor may change. For example, when upper end 512 is disposed adjacent a first end portion 560 of spine member 344, body 302 may have a more upright configuration, as in FIG. 5. However, when upper end 512 is disposed closer to second end portion 562 of spine member 344, body 302 may have a more reclined configuration, as in, for example, FIG. 7B.

Seat 110 may also include a harness. The harness may be integrated into seat 110 and selectively deployed according to the operating mode and/or user preferences.

Figure 6C:
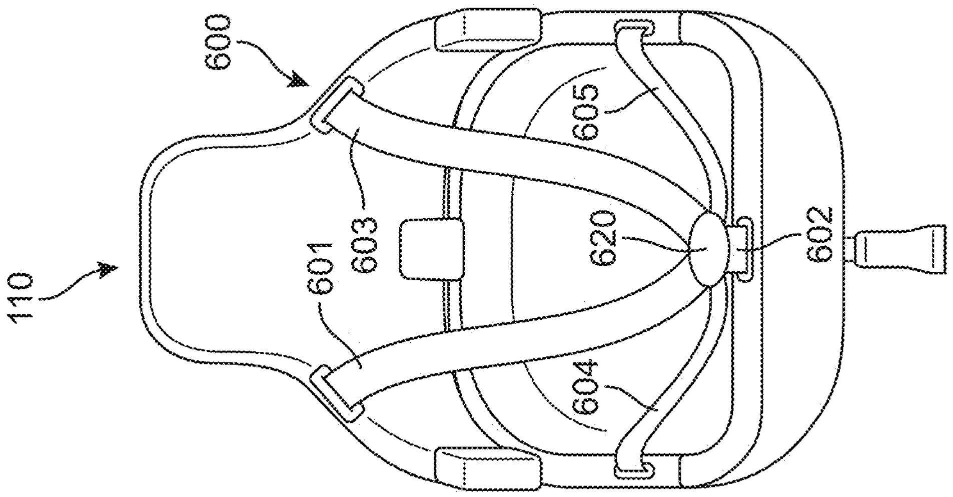
FIGS. 6A-C are schematic views showing a harness being deployed from a seat, according to an embodiment.
Figure 6B:
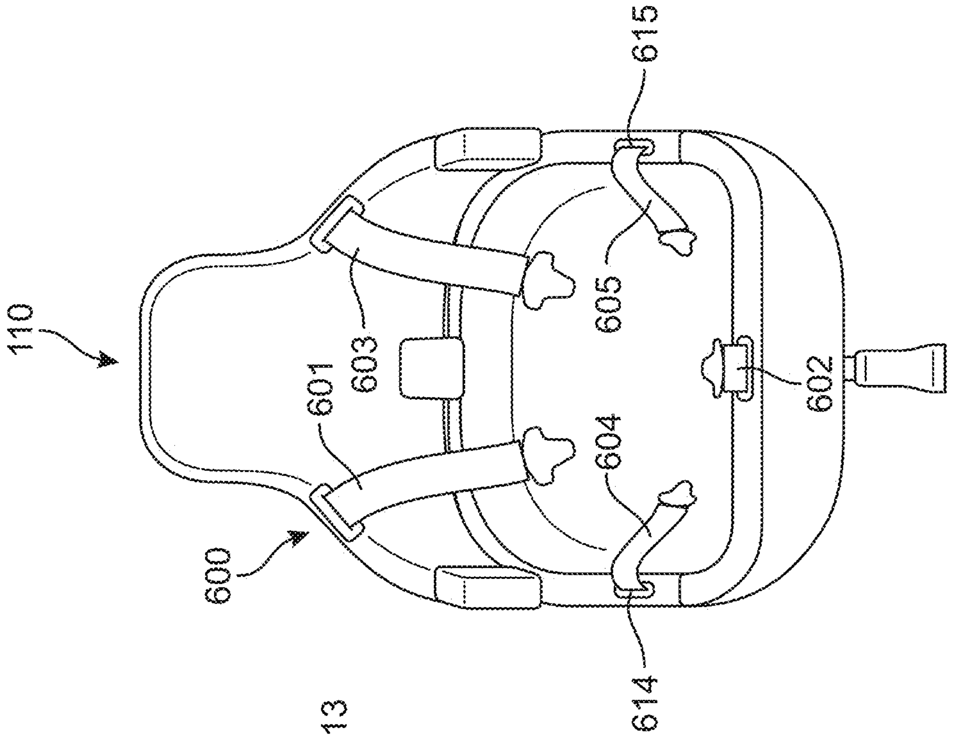
Figure 6A:
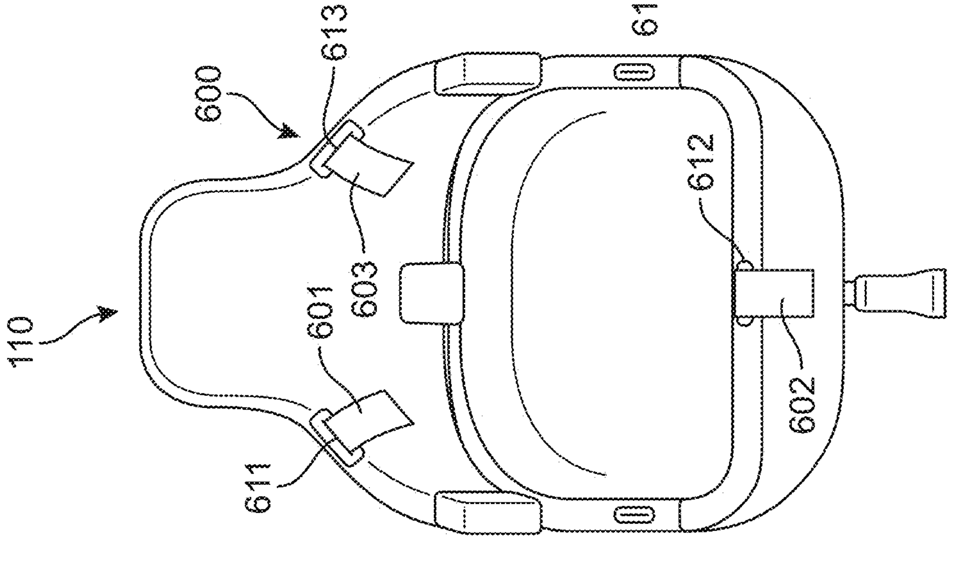

Referring to FIGS. 6A-C, a harness 600 is shown being actively deployed. As shown, individual straps of a five-point harness may be deployed from corresponding slots around a periphery of seat 110. Specifically, in a first stage, as shown in FIG. 6A, a first strap 601, a second strap 602 and a third strap 603 extend from a first seat slot 611, a second seat slot 612, and a third seat slot 613, respectively. In a second stage, as shown in FIG. 6B, a fourth strap 604 and a fifth strap 605 are also deployed from a fourth seat slot 614 and a fifth seat slot 615, respectively. In a third stage, as shown in FIG. 6C, the deployed ends of all five straps converge and become attached at harness connection portion 620. With the straps all connected, an occupant of seat 110 may be secured.

It is contemplated that in at least some embodiments, harness 600 may be automatically deployed from the corresponding slots disposed on a periphery of seat 110. In some embodiments, the straps of harness are comprised of a material with a stiffness that can be adjusted dynamically. To deploy the straps, the material may be put in a relatively stiff state, so that the straps can be more easily "pushed" out of the slots using suitable actuating mechanisms within seat 110. In some embodiments, straps may be comprised of a rheological materials. For example, some rheological fluids may change between a liquid state and a solid state when electric and/or magnetic fields are applied, thereby allowing the stiffness of the material to be dynamically adjusted.

In some embodiments, the ends of each strap may be made of a magnetic material so that the ends of the straps automatically connect at a single harness connection portion 620. Alternatively, the ends of each strap may include a mechanism or mechanical assembly to enable the ends of the straps to connect at harness connection portion 620. Alternatively, in some cases, some portions of harness 600 may be manually deployed in any strap sequence. Optionally, the straps of harness 600 may be automatically deployed, while the final step of connecting the ends of the straps into a connection portion to secure the harness may be performed manually.

As discussed, a system may adjust properties of a vehicle seat according to the selected driving mode to elicit specific emotions or other mental states from occupants. In some cases, the system may adjust the color and/or intensity of the plurality of illuminated portions. In some cases, the system may adjust the position and/or orientation of the seat. In some cases, the system may adjust the state of a harness. In some cases, the system may simultaneously adjust the operation of the seat lighting system, the seat positioning system and the harness system such that these systems cooperate to elicit particular emotions in occupants and improve the occupant's technical and emotional experience of the vehicle.

Figure 7C:
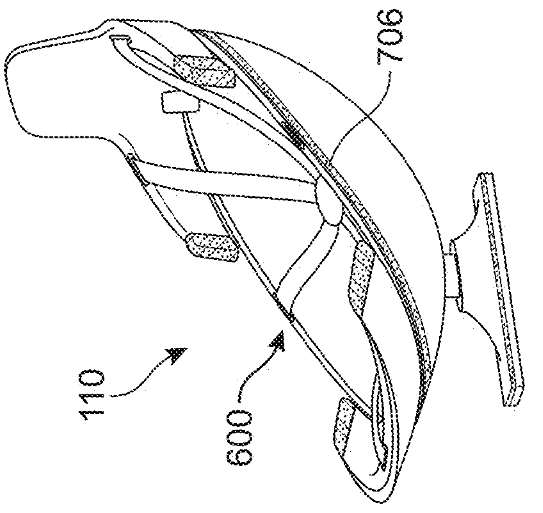
FIGS. 7A-C are schematic views showing different types of illumination for a seat, according to an embodiment.
Figure 7B:
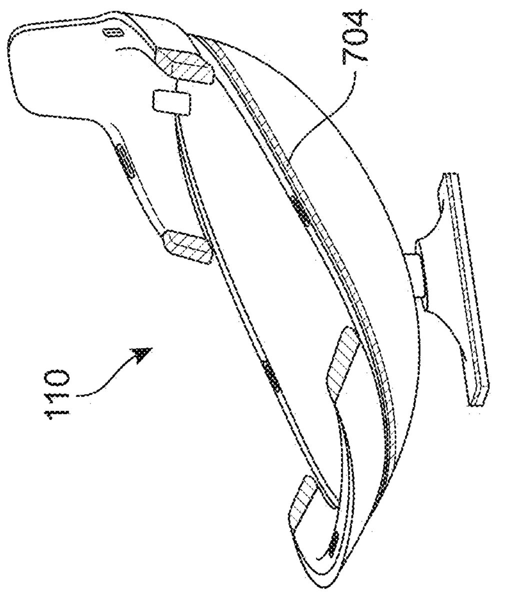
Figure 7A:
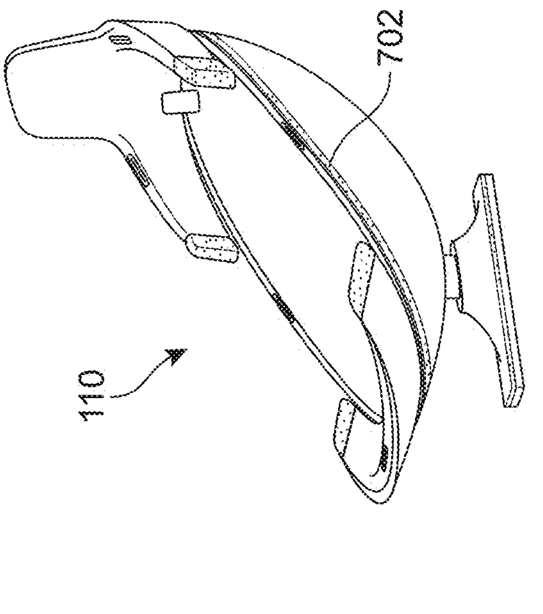

In FIGS. 7A-C, seat 110 is configured in three different states for three different driving modes, including the welcome mode (FIG. 7A), the autonomous driving mode (FIG. 7B) and the manual driving mode (FIG. 7C). Each state may be associated with a different illumination pattern. In this embodiment, the color of the illuminated portions change between different driving modes, which is indicated in the Figures using different types of shading. In the welcome mode of FIG. 7A, the plurality of illumination portions have a first color 702. In the autonomous driving mode of FIG. 7B, the plurality of illuminated portions have a second color 704. In the manual driving mode of FIG. 7C, the plurality of illuminated portions have a third color 706. It is noted that FIG. 7C may be representative of a sport driving mode as well.

Each color may be tailored to elicit specific emotional responses according to the driving mode. For example, first color 702 may be a cool/calming color such as blue. This may help elicit a calm emotional state in an occupant who has just entered the vehicle. Second color 704 may be a color associated with relaxation or mild stimulation, such as purple. This may help keep the occupant relaxed as the vehicle is autonomously driven. Third color 706 may be a color associated with higher stimulation and attention, such as red. This may help the driver be more attentive to the driving experience as the vehicle is manually driven.

In some embodiments, the intensity of light emitted by one or more illuminated portions may change dynamically in response to different vehicle states. As an example, in some embodiments, the intensity of illuminated portions associated with bolsters of the seat (for example, second illuminated region 362, third illuminated region 363, fourth illuminated region 364 and fifth illuminated region 365 shown in FIG. 3) may increase as the vehicle experiences increased G-forces (as sensed by sensor systems 230).

Seat 110 may also have different orientations in the different driving modes. For example, in the welcome mode of FIG. 7A as well as the manual driving mode of FIG. 7C, seat 110 may have a generally upright orientation. In the parking mode, this upright position helps increase space in the interior cabin while occupants enter and exit the vehicle. In the manual driving mode, this upright position helps keep the driver in a more reactive posture. By contrast, in the autonomous driving mode of FIG. 7B, seat 110 may be somewhat reclined. This allows the opportunity for an occupant to relax and rest while the vehicle is being autonomously driven.

As seen in FIGS. 7A-C, harness 600 may be retracted within seat 110 in the parking mode and in the autonomous mode, as there is a low chance of collision in these modes. By contrast, in the manual driving mode of FIG. 7C, harness 600 has been extended and may secure an occupant within seat 110. This not only helps protect the occupant in the more immersive driving mode, but the sensation of the harness may also be associated, in the driver's mind, with the more active/alert driving state.

Figure 8A:
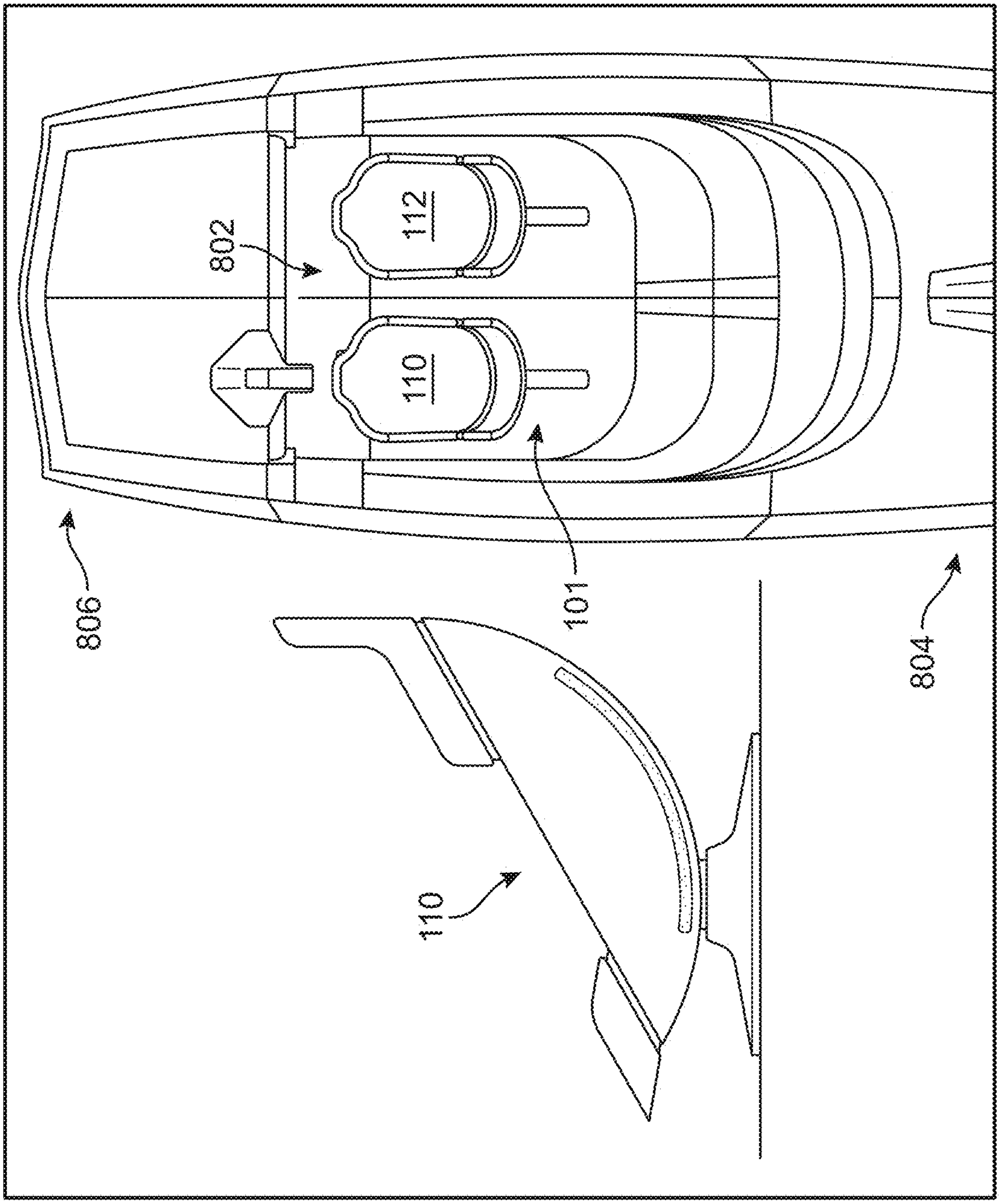
FIGS. 8A-C are schematic views showing different seating configurations within a motor vehicle, according to an embodiment.
Figure 8B:
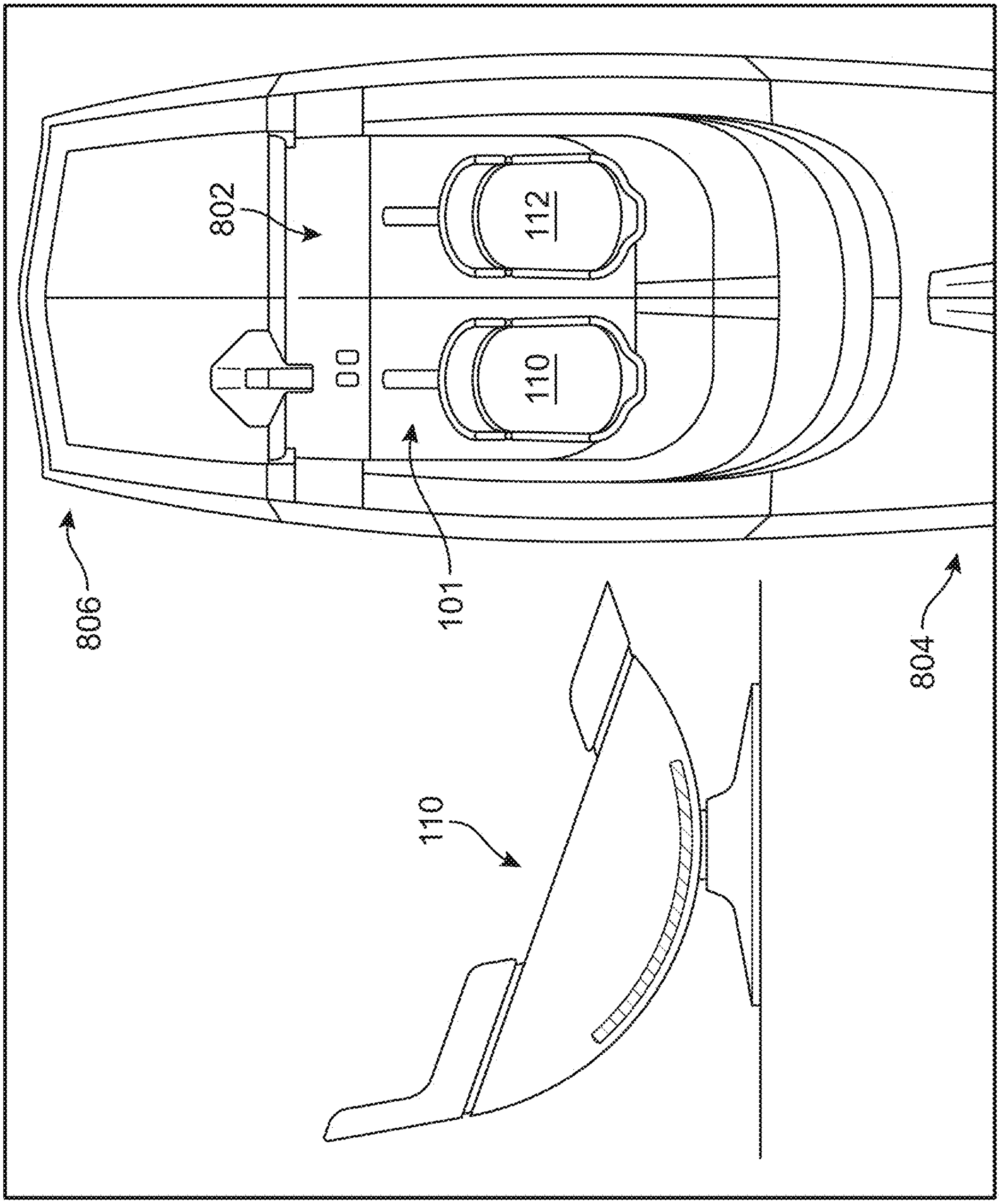
Figure 8C:
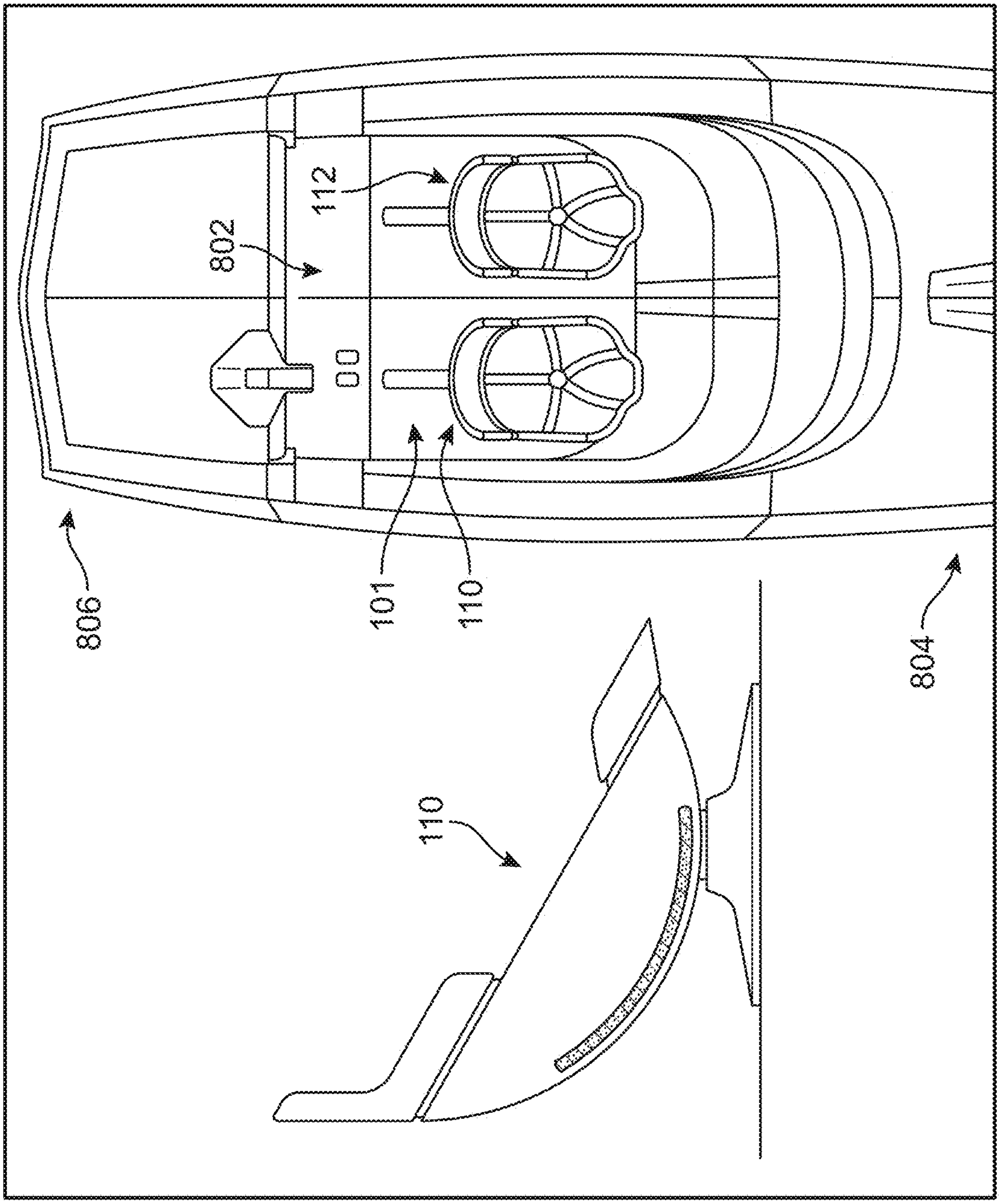

FIGS. 8A-C are schematic views showing first seat 110 and second seat 112 in different positions within interior cabin 101, according to the driving mode. For reference, each of FIGS. 8A-C show seat 110 in a particular orientation (on the left) and in a particular linear position within interior cabin 101 of motor vehicle 100 (on the right).

In a welcome mode, as shown in FIG. 8A, seat 110 may be positioned adjacent a front console area 802 of interior cabin 101. Seat 110 may also be rotated such that seat 110 faces towards a rearward end 804 of motor vehicle 100.

Similarly, second seat 112 may have a similar orientation and position within interior cabin 101.

The selected position and orientation of seat 110 and seat 112 may elicit an open and welcoming feeling to occupants. Specifically, the forward positions of seat 110 and seat 112 may increase room within interior cabin 101 into which occupants may more easily enter and exit through doors of motor vehicle 100. Additionally, seat 110 and seat 112 facing in a rearward direction may help evoke an emotional state in which the occupants feel free to talk with one another as if they were in a living room or other open space. As seen in the left view of FIG. 8A, seat 110 may also be relatively upright to increase space in the cabin and facilitate engagement between occupants.

In an autonomous driving mode, as shown in FIG. 8B, seat 110 and seat 112 may be positioned within a center of interior cabin 101, and in particular seat 110 and seat 112 may be closer to rearward end 804 relative to their positions in the welcome mode of FIG. 8A. Additionally, seat 110 and seat 112 may be rotated so that both seats face towards forward end 806 of motor vehicle 100 (e.g., by rotating about rotational direction 506 in FIG. 5, for example). In some cases, seat 110 and seat 112 may also be slightly inclined, relative to the positions of these seats in the welcome mode.

The selected position and orientation of seat 110 and seat 112 may elicit emotions related to relaxation. Because the vehicle is in the autonomous driving mode, the occupants do not need to be concerned with the operation of motor vehicle 100, and instead may focus on relaxing or otherwise resting.

In a manual driving mode, as shown in FIG. 8C, seat 110 and seat 112 may also be positioned within a center of interior cabin 101, and in particular seat 110 and seat 112 may be closer to rearward end 804 relative to their positions in the welcome mode of FIG. 8A. Additionally, seat 110 and seat 112 may be rotated so that both seats face towards forward end 806 of motor vehicle 100. In some cases, seat 110 and seat 112 may also be relatively upright, as compared to the relatively inclined positions of the seats in the autonomous driving mode of FIG. 8B.

The selected position and orientation of seat 110 and seat 112 may elicit emotions related to stimulation and focus. Because the vehicle is in the manual driving mode, the driver should be alert and concerned with the operation of motor vehicle 100.

The following includes definitions of selected terms employed herein. The definitions include various examples and/or forms of components that fall within the scope of a term and that may be used for implementation. The examples are not intended to be limiting. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

The processor may be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system may include a display interface that forwards graphics, text, and other data from the communication infrastructure (or from a frame buffer) for display on a display unit. Display unit may include display, in one example. Computer system also includes a main memory, e.g., random access memory (RAM), and may also include a secondary memory. The secondary memory may include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc.

Software and data transferred via communications interface are in the form of signals, which may be electronic, electromagnetic, optical or other signals capable of being received by communications interface. These signals are provided to communications interface via a communications path (e.g., channel). This path carries signals and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein may be directed to such computer program products. Communications device may include communications interface.

Computer programs (also referred to as computer control logic) are stored in main memory and/or secondary memory. Computer programs may also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software may be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art may readily appreciate that the sequences may be varied and still remain within the spirit and scope of the present embodiments.

The invention claimed is:

1. A motor vehicle, comprising:

a seat and a harness integrated into the seat, the harness having a retracted position in which the harness is retracted within the seat and the harness having an extended position in which the harness is extended from the seat and configured to secure an occupant in the seat;

wherein the motor vehicle is configurable in a first driving mode and a second driving mode;

wherein the harness is automatically placed in the retracted position when the motor vehicle is in the first driving mode and wherein the harness is automatically placed in the extended position when the motor vehicle is in the second driving mode; and wherein the harness includes a strap, wherein the strap has an adjustable stiffness, and wherein the stiffness of the strap is increased as the harness is placed in the extended position.

2. The motor vehicle according to claim 1, wherein the motor vehicle operates differently in the first driving mode than in the second driving mode.

3. The motor vehicle according to claim 1, wherein the seat is configurable in a first position and wherein the seat is configurable in a second position, and wherein the seat is automatically adjusted to the first position when the motor vehicle enters the first driving mode and wherein the seat is automatically adjusted to the second position when the motor vehicle enters the second driving mode.

4. The motor vehicle according to claim 1, wherein the seat further comprises:

a body and a curved spine member attached to the body;

a base attachment member attached at a first end to the curved spine member and at a second end to a floor of the motor vehicle;

wherein the first end of the base attachment member slides along the curved spine member to change an orientation of the body;

wherein the seat has a first position in which the first end of the base attachment member is attached to a first portion of the curved spine member and wherein the seat has a second position in which the first end of the base attachment member is attached to a second portion of the curved spine member.

5. The motor vehicle according to claim 1, wherein the first driving mode is an autonomous driving mode and wherein the second driving mode is a manual driving mode.

6. The motor vehicle according to claim 1, wherein the harness comprises a five-point harness.

7. The motor vehicle according to claim 1, wherein the strap is extended and retracted from a slot in a periphery of the seat.

8. The motor vehicle according to claim 1, wherein the seat further comprises an illuminated portion; and wherein the illuminated portion changes colors between the first driving mode and the second driving mode.

9. The motor vehicle according to claim 8, wherein the illuminated portion comprises a ring-like region around a portion of the seat.

10. The motor vehicle according to claim 8, wherein the illuminated portion is disposed in a bolster of the seat.

* * * * *